(12) United States Patent
Penn et al.

(10) Patent No.: US 7,651,227 B2
(45) Date of Patent: Jan. 26, 2010

(54) PROJECTION SYSTEM AND METHOD INCLUDING SPATIAL LIGHT MODULATOR AND COMPACT DIFFRACTIVE OPTICS

(75) Inventors: Steven Monroe Penn, Plano, TX (US); Duane Scott Dewald, Dallas, TX (US); Ronald Allen Barry, Frisco, TX (US)

(73) Assignee: Texas Instruments Incorporated, Dallas, TX (US)

( * ) Notice: Subject to any disclaimer, the term of this patent is extended or adjusted under 35 U.S.C. 154(b) by 521 days.

(21) Appl. No.: 11/225,327

(22) Filed: Sep. 13, 2005

(65) Prior Publication Data

US 2007/0058143 A1    Mar. 15, 2007

(51) Int. Cl.
*G03B 21/20* (2006.01)
*G03B 21/14* (2006.01)
*H04N 5/74* (2006.01)
*H04N 3/26* (2006.01)
*G02B 5/32* (2006.01)
*G02B 5/18* (2006.01)
*G02F 1/135* (2006.01)

(52) U.S. Cl. ............ 353/102; 353/20; 353/84; 348/771; 348/345; 348/745; 359/15; 359/20; 359/568; 349/30

(58) Field of Classification Search ............ 353/102, 353/20, 84, 76; 348/771, 326, 345, 745, 348/806; 359/15, 20, 563, 558, 568, 27; 362/553, 259, 26, 600, 511; 349/30
See application file for complete search history.

(56) References Cited

U.S. PATENT DOCUMENTS

| 5,256,869 | A * | 10/1993 | Lin et al. ............ 250/201.9 |
| 2003/0147112 | A1* | 8/2003 | Mukawa ............ 359/15 |
| 2004/0130762 | A1* | 7/2004 | Thomas et al. ............ 359/15 |

OTHER PUBLICATIONS

Nesbitt, R.S. "Edgelit Holography: Extending Size and Color," M.S. Thesis, Massachusetts Institute of Technology, Sep. 1999.
Sinha, A. et al., "Imaging Using Volume Holograms," Optical Engineering, vol. 43, No. 9, Sep. 2004, pp. 1959-1972.

* cited by examiner

*Primary Examiner*—Georgia Y Epps
*Assistant Examiner*—Magda Cruz
(74) *Attorney, Agent, or Firm*—Charles A. Brill; Wade James Brady, III; Frederick J. Telecky, Jr.

(57) ABSTRACT

A method and apparatus for a projection display system includes a spatial light modulator and a volume illumination hologram. The spatial light modulator comprises a digital micromirror device, and the projection system includes a laser light source to produce a sequence of collimated, colored, light beams for the illumination hologram. Waste light produced by the spatial light modulator is transmitted to the illumination hologram, and the illumination hologram emits waste light from at least one of its edges. Waste light emitted from an edge of the illumination hologram is absorbed by a light sensor to control the intensity of the light beams. A projection focusing element is mounted proximate a side of the illumination hologram to focus the image beam from the spatial light modulator for viewing. A projection hologram is interposed between the side of the illumination hologram and the projection focusing element to manage waste light.

33 Claims, 10 Drawing Sheets

PROJECTION SYSTEM AND METHOD INCLUDING SPATIAL LIGHT MODULATOR AND COMPACT DIFFRACTIVE OPTICS

TECHNICAL FIELD

This invention relates generally to the field of spatial light modulator display systems and methods, and more particularly to spatial light modulator display systems and methods including a holographic optical element.

BACKGROUND

Spatial light modulators, such as a DMD (digital micromirror device), can be used to create projectable images that are displayed in rear-projection television receivers and in consumer, business, and large-venue image projection systems. Other spatial light modulators such as LCDs (liquid crystal displays) are also used in some image projection applications. An example of a digital micromirror device is a DLP™ ("digital light processor"), manufactured by Texas Instruments, which uses an array of micromirrors with selectively controllable orientations to form a projectable image. Digital micromirror devices generally are the preferred image-forming components in projection systems requiring high illumination levels. As an example, DLP™ technology has enabled the design of small and bright projection display systems that weigh less than three pounds for a 1500 Lm output. Recently, small LED (light-emitting diode) light sources have enabled the design of one pound, pocket-sized DLP™ projectors; however, the required optical elements generally remain as a costly contributor to the size and weight of the projector. Since the light emitted by LEDs is typically in a Lambertian pattern with limited intensity, it has been difficult to couple LEDs into low-etendue spatial light modulator panels, resulting in low projection brightness levels of less than 50 Lm. To provide improved projector performance from a much smaller, lower-cost system, a DMD light modulator generally would require compact optics and a collimated light source, such as a laser diode, and would be an attractive addition to the marketplace. Such a product would preferably project an image with intensity greater than about 1000 Lm, and weigh less than about one pound.

In typical single-DMD projectors, image data comprises separate color frames corresponding to individual primary colors, typically red, green and blue, from which substantially the entire visible spectrum is derived. When solid-state or filtered colored light sources are operated in synchronization with the DMD, each color-frame image is selectively projected in sequence to a target screen for viewing by an audience.

To generate a broad-spectrum image using primary colors, monochromatic or filtered colored light sources are operated in sequence with prescribed on-times or duty cycles. When color-frames are rapidly rendered on a screen, the human eye perceives the required color hue and intensity at each pixel of the on-screen image. For example, to obtain a green-only image, a green light source would be turned on simultaneously with the DMD mirrors that spatially modulate the light beam according to the green color-frame image data. To obtain other colors, secondary colors or mixed color hues of red, green, and blue light illuminate the DMD in a sequence, at a frequency typically greater than 180 Hz. High-frequency, color-frame images are then integrated by the eyes of the audience. For example, for a white image, the duty cycle for solid-state light emitting diodes is typically 50% green, 30% red, and 20% blue light. The proportions may vary depending on the desired color temperature of the projected white image.

FIG. 1 illustrates a projection system of the prior art that uses a single DLP™ spatial light modulator with existing DLP™ optics, light source, and illumination methods. DLP™ projectors such as the illustrated projector using one DMD typically use UHP (ultra-high-pressure) arc lamps 200 and a complex set of relay optics 201 for DMD illumination. The optical path includes a condenser lens 202, a rotating color filter wheel assembly 204, relay lens 207, a spatial light modulator (DMD) 218, a projection lens 220, and a fan assembly 222. Such projection systems are complex and require substantial space for their implementation.

FIG. 2 illustrates another optical architecture of the prior art using one DMD and a TIR (total internal reflection) prism system, which generally results in an illumination light beam with an area equal to or larger than the DMD active mirror area. Again, this arrangement generally requires substantial volume for its construction. White light from high-intensity lamps such as UHP arc lamps is converted into primary wavelengths (such as red, green, and blue) by a sequence of filters arranged on a spinning disc or color wheel. This system comprises a high-intensity lamp assembly 200 (the illumination source), condenser lens 202, rotating color filter wheel assembly 204, integrator rod 206, relay lenses 208, 210, and 212, TIR prism assembly 214, DMD 218, and projection lens 220. In the one-DMD architecture illustrated in the figure, the spinning disc or color wheel in assembly 204 sequentially exposes the single DMD device to the filtered light from the high-intensity lamp to produce a colored image.

In operation, the optical architecture illustrated in FIG. 2 focuses white light from the lamp assembly 200 onto a small spot on the surface of the color filter wheel 204 by means of the condenser lens 202. Sequential color light (such as red, green, and blue) coming through the color wheel in the rotating wheel assembly 204 is integrated by the integrator rod 206 to produce a uniform light beam using multiple internal reflections in a transparent optical medium. The resulting beam is coupled to a set of relay lenses. The set of relay lenses is typically made up of a first lens 208, a second lens 210, and a third lens 212, which shape the color light beam to fit the optical aperture of TIR prism assembly 214. The sequenced colored light coupled into the TIR prism strikes a first TIR prism surface 216 at an angle greater than the critical angle of the surface and reflects off the surface onto the surface of DMD 218. Modulated light is reflected from "on-state" mirrors of DMD 218 back through the TIR prism assembly 214, and strike the TIR prism surface 216 at an angle less than the critical angle of the surface. The light therefore passes through the TIR prism surface, out of the prism assembly 214, and into the projection lens 220 which focuses the image on a screen.

FIG. 3 illustrates a light beam 305 shining on a DMD micromirror 310 at an angle to the DMD surface, typically 24 to 28 degrees. The micromirrors in the DMD are formed so that tilting a DMD micromirror, 311, plus 12 degrees (i.e., toward the illumination beam) results in a nearly normal "on-state" reflection 315 of the beam into the optical projection axis. Tilting a DMD micromirror, 312, minus 12 degrees (i.e., away from the illumination beam) results in an "off-state" beam axis 320 that is directed 48 to 52 degrees away from the optical projection axis. When the mirrors are unexcited, i.e., when they are in the "flat state," the beam is reflected in an intermediate direction, 325. For good contrast, care should be taken to assure that "off-state" waste light does not enter the projection path.

FIG. 4 illustrates a three-DMD projector that eliminates the rotating color wheel and uses three DMDs with stationary optical elements to project a color image. In this arrangement, each DMD 418 is exposed to only one color, such as a primary color, and additional coated, reflecting prisms 435, 440, and 445 are required to separate white light into colors such as the primary colors red, green, and blue. The prisms may use dichroic coatings to filter the white light. The modulated and filtered light is then directed and recombined into the projection path. In the interest of brevity, the remaining elements in FIG. 4 and in subsequent figures with reference designations, the same as reference designations of items previously described will not be redescribed.

The illumination and projection optics as described with reference to FIGS. 1-4 generally are carefully designed, manufactured and assembled to obtain maximum brightness and performance in a DLP™ projection system. Proper image focus, color, and uniformity require numerous lenses and/or TIR prisms. Unless these elements are carefully designed, coated, and mechanically aligned, the multiple faces of the lens and prism elements can cause significant loss in contrast and light throughput. In practice, these projection systems generally are manufactured at significant cost by companies specializing in glass optics fabrication and precision optical assembly.

Generally, limitations of prior art projection systems using spatial light modulators are the use of distributed, expensive, and inefficient light sources that cannot be located directly adjacent to an image forming device, such as a digital micromirror device, with minimal space between optical components. The prior-art projection arrangements generally result in large physical volume for the projection system, which cannot be assembled on a common printed-wiring board with control, power, and sensor electronics. Severe limitations generally result for application in portable telephones, personal computer displays, game systems, and automotive/aircraft/marine displays where minimum size, weight, and cost are required. Limitations of prior art projection systems generally are also apparent in applications for portable front projectors and rear-projection televisions where image brightness, weight, and cost are critical marketing elements. Thus, what is needed in the art is a projection system using a spatial light modulator, such as a digital micromirror device, that circumvents these restrictions, utilizing smaller, lower cost, and more compact optics than can be used with UHP or incandescent light sources.

SUMMARY OF THE INVENTION

Embodiments of the invention achieve technical advantages as an image projection system including a spatial light modulator and a diffractive optical element. In accordance with a preferred embodiment, the spatial light modulator comprises a digital micromirror device. In a preferred embodiment, the diffractive optical element is a holographic optical element. In a preferred embodiment, the projection system includes a light source to produce a sequence of collimated, colored, light beams, and the diffractive optical element comprises an illumination hologram that is optically coupled to the light source and is sequentially illuminated by the light beams. In a preferred embodiment, the collimated, colored, light beams are produced by solid-state lasers. In a preferred embodiment, the illumination hologram is a volume hologram. In a preferred embodiment, waste light is produced by the spatial light modulator and transmitted to the illumination hologram, and the illumination hologram emits waste light from at least one of its edges. In a preferred embodiment, waste light emitted from an edge of the illumination hologram is absorbed by a light sensor to produce an intensity signal coupled to a controller. The controller is coupled to the light source to control the intensity of the collimated, colored, light beams produced by the light source using the intensity signal to produce a high quality image. In a preferred embodiment the spatial light modulator is mounted proximate one side of the illumination hologram and illuminated by a beam of light from the illumination hologram to form an image beam. In a preferred embodiment, the beam of light illuminates a digital micromirror device at an angle, such as an angle of about 26 degrees. In a further preferred embodiment, the beam of light illuminates a digital micromirror device at an angle between about 20 and 30 degrees.

In a further preferred embodiment, a projection focusing element is mounted proximate another side of the illumination hologram that receives the image beam from the spatial light modulator and focuses the image beam for viewing. In a further preferred embodiment, a projection hologram is interposed between the second side of the illumination hologram and the projection focusing element. The projection hologram receives the image beam from the illumination hologram and waste light produced by the spatial light modulator and emits waste light from an edge of the projection hologram. In a preferred embodiment, the projection hologram is bonded to the illumination hologram with index-matching optical material.

In a further preferred embodiment, the projection focusing element is a kinoform optical element. In a preferred embodiment, the kinoform optical element comprises a first side with a binary diffractive surface. In a further preferred embodiment, the kinoform optical element comprises a second side with a refractive image-focusing surface.

Another embodiment of the present invention is a method of configuring a system including a spatial light modulator and a holographic optical element to project an image. In a preferred embodiment, the method includes using a digital micromirror device for a spatial light modulator. In a preferred embodiment, the method includes using a light source to produce a sequence of collimated, colored, light beams, and a holographic element as an illumination hologram that is optically coupled to the light source to sequentially illuminate the spatial light modulator with the light beams. In a preferred embodiment, the method includes producing collimated, colored, light beams with solid-state lasers. In a preferred embodiment, the method includes using a volume hologram for the illumination hologram. In a preferred embodiment, the method includes capturing waste light produced by the spatial light modulator with the illumination hologram, and arranging the illumination hologram to emit waste light from at least one of its edges. In a preferred embodiment, the method includes arranging a light sensor to absorb waste light emitted from an edge of the illumination hologram and controlling the intensity of the collimated, colored, light beams produced by the light source using the intensity of the waste light. In a preferred embodiment the method includes mounting the spatial light modulator proximate one side of the illumination hologram and illuminating the spatial light modulator with a beam of light from the illumination hologram to form an image beam. In a preferred embodiment, the method includes illuminating a digital micromirror device with the beam of light from the illumination hologram at an angle such as 26 degrees. In a further preferred embodiment, the method includes illuminating a digital micromirror device at an angle between about 20 and 30 degrees.

In a further preferred embodiment, the method further includes mounting a projection focusing element proximate another side of the illumination hologram and receiving the image beam from the spatial light modulator in the projection focusing element and focusing the image beam therewith for viewing. In a further preferred embodiment, the method includes interposing a projection hologram between the second side of the illumination hologram and the projection focusing element. The method includes receiving the image beam from the illumination hologram and waste light produced by the spatial light modulator in the projection hologram and emitting waste light from an edge of the projection hologram. In a preferred embodiment, the method includes bonding the projection hologram to the illumination hologram with index-matching optical material.

In a further preferred embodiment, the method further includes using a kinoform optical element for the projection focusing element. In a preferred embodiment, the method includes forming a binary diffractive surface on a first side of the kinoform optical element. In a further preferred embodiment, the method includes forming a refractive image-focusing surface on a second side of the kinoform optical element.

Embodiments of the present invention solve the problem of producing a bright image in a projection system in a small physical volume with low weight and cost. Embodiments of the present invention advantageously provide a projection display device and methods that can be compactly assembled on a common printed-wiring board with control, power, and sensor electronics.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of presently preferred embodiments are discussed in detail below. It should be appreciated, however, that the invention provides many applicable inventive concepts that can be embodied in a wide variety of specific contexts. The specific embodiments discussed are merely illustrative of specific ways to make and use the invention, and do not limit the scope of the invention.

Embodiments of the invention will be described with respect to preferred embodiments in a specific context, namely an apparatus and method for projecting an image using a diffractive optical element and a spatial light modulator. Embodiments comprise an image projection system using a holographic optical element, a spatial light modulator, and solid-state light sources that advantageously can be configured in a small volume. Alternative embodiments further comprise a second holographic optical element to redirect waste light to improve projected image quality.

Figure 5:
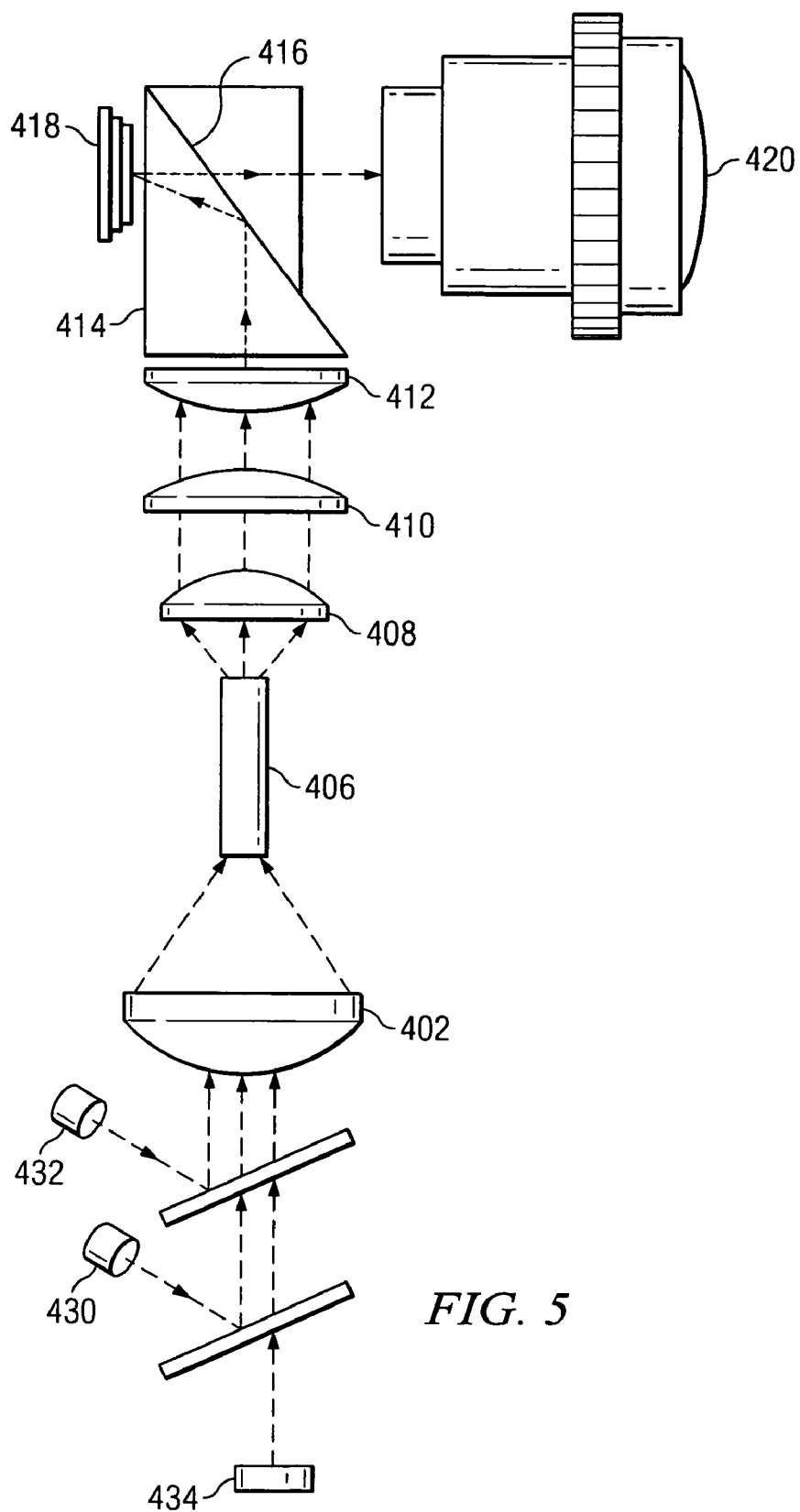
FIG. 5 illustrates a single-DMD illumination architecture of the prior art using LEDs.

An illumination system comprising recently developed solid-state light sources using solid-state light-emitting devices is illustrated in FIG. 5. Examples of solid-state light-emitting devices include light-emitting diodes (LEDs) (430, 432, 434) and lasers, the latter being capable of producing high levels of monochromatic, coherent, and polarized illumination. This system is an alternative to the UHP lamp and color-wheel system that takes advantage of the small size of LEDs compared to UHP lamps in existing projectors and the inherently colored emission of LEDs. These advantages permit fabrication and assembly of the light source on a common printed-wiring board with a spatial light modulator. The use of solid-state light-emitting devices relieves some of the design issues associated with UHP lamps and reduces system volume. However, the large etendue of LEDs, i.e., their non-collimated emission of light over a wide emitting area and over a wide solid angle, still generally requires the use of numerous, large, and complex optics (402, 406, 408, 410, 412, 414, 416, 420) to collimate the light and to direct the resulting beam at a proper angle onto a spatial light modulator such as a DMD and to focus the images on a screen.

Using a holographic approach for illuminating a spatial light modulator in accordance with an embodiment of the invention allows a spatial light modulator, collimated solid-state light sources, the holographic illumination optics, projection optics and the focusing optics to be assembled with the DMD with little or no air space between components, resulting in a very small physical volume for a projector. Control, power, and sensor electronics can be assembled on a common printed-wiring board. The resulting projection system is ideal for portable telephones, personal data displays, game systems, and automotive/aircraft/marine displays where minimum size and weight are required. It significantly improves the projected light intensity and reduces the weight and cost of the projector, making it an attractive design for projectors for business and personal use, and for rear-projection television receivers.

Figure 6A:
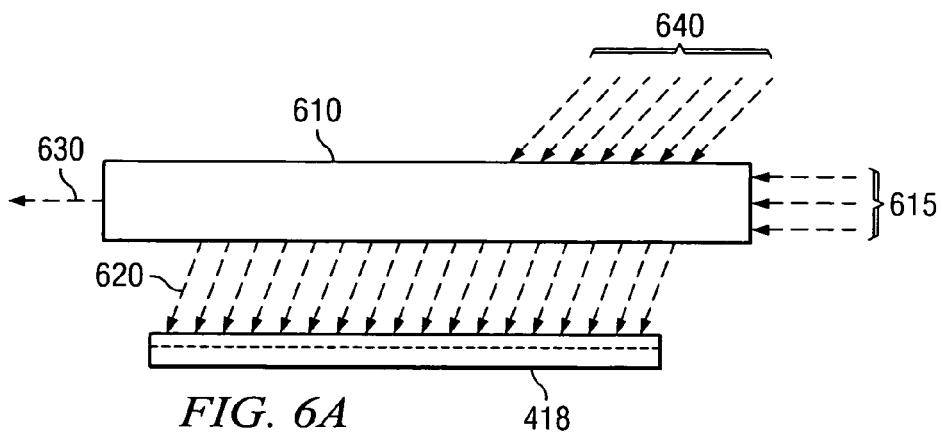
FIGS. 6A, 6B, 6C, and 6D, illustrate DMD illumination using a holographic optical element of the invention.

FIG. 6A illustrates, in accordance with an embodiment of the invention, a volume hologram RGB (red-green-blue) stack 610 (an illumination hologram) illuminating a spatial light modulator with a beam of light at a desired angle such as an angle of about 26 degrees. Of course, other illumination angles may be employed in particular designs such as angles between about 20 and 30 degrees. The illumination hologram may be formed of a gel or other optical material, including PMMA (polymethylmethacrylate) or a crystalline structure, photorefractive crystal, photorefractive polymer, or a stack of these film materials. In the illustrated embodiment, the spatial light modulator is a digital micromirror device such as DMD 418. Other spatial light modulators such as LCDs can also be used. Collimated, nearly monochromatic light 615, preferably from solid-state light sources such as lasers or a diode array and preferably in primary colors, is sequentially directed into an illumination hologram or a DOE (diffractive optical element), preferably from one or more side edges, such that the light initially travels nearly parallel to or at a small angle such as 5 degrees to the DMD active area. The illumination hologram or film guides illumination light rays along a prescribed path to the target mirrors of the DMD to produce the illumination beam 620 for the DMD at a preferred angle such as 26 degrees. The separate light beams of each color may enter the hologram from different side edges of the holographic optical element or film. Alternatively, the colored light beams may enter from the same side or edge of the illumination hologram. In a further embodiment, a transmissive light path 640 from lasers or a diode array can be used. Waste light 630 not diffracted to the DMD by the illumination hologram or film exits the illumination hologram from one or more edges.

An element on a figure with the same reference number as an element on a previous figure will generally not be redescribed in the interest of brevity.

Figure 6B:
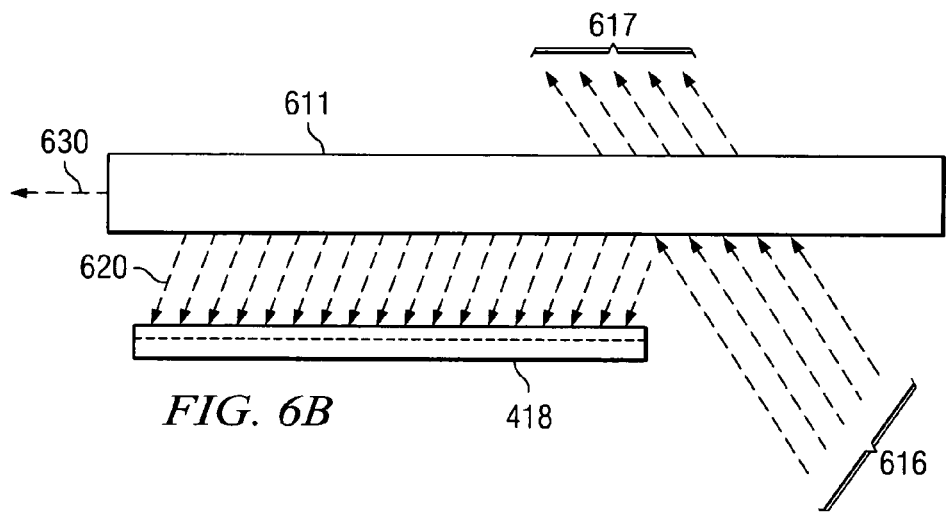

As illustrated in FIG. 6B, in accordance with a further embodiment of the invention, beams from colored light sources 616, preferably from solid-state light sources such as lasers or a diode array and preferably including primary colors, may also be directed at a reflective-type illumination hologram such as volume hologram 611 from the side closest to the DMD active area to enable smaller packaged assemblies and fabrication of the light sources close to the DMD and/or the DMD substrate. Waste light 617 and 630 not diffracted to the DMD by the illumination hologram or film exits from one or more edges and the top surface of the illumination hologram.

Embodiments of the invention using either reflective or refractive holograms are achievable, and the choice is generally determined by system packaging requirements, cost, and hologram design.

Figure 6C:
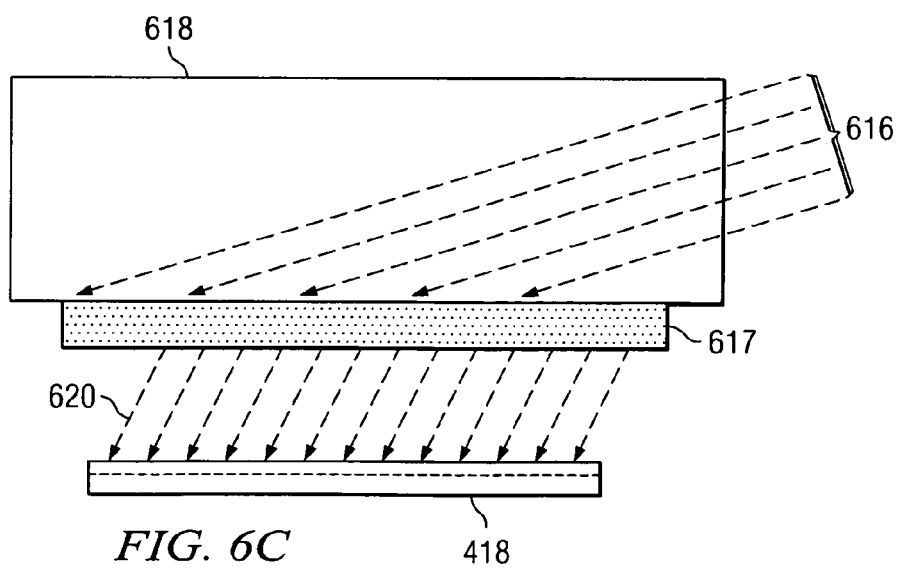

The light processing performance of illumination holograms in an embodiment of the invention can sometimes be improved by advantageously applying the incident light beam onto the hologram at a small angle such as an angle of about five degrees. The preferred angle will generally be dependent on the wavelength of the incident light beam. The DE (diffraction efficiency) of the hologram is the ratio of the light energy in the reconstructed beam divided by the light energy in the incident reference beam. The more energy of the incident beam transformed by the hologram into energy of the reconstructed beam, the higher the brightness of illumination at the DMD. FIG. 6C illustrates an illumination hologram formed with a photosensitive layer 617 that is holographically exposed, developed, and mounted below a transparent medium 618. An incident light beam 616 illuminates the hologram at a small angle, producing the input light for the DMD micromirror array 418 at a desired illumination angle such as 26 degrees.

Figure 6D:
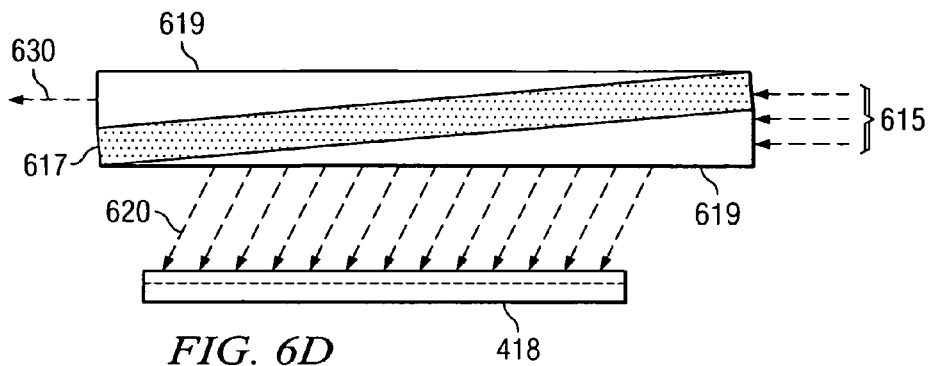

An alternative embodiment of the invention that can advantageously use the properties of an illumination hologram illuminated at a small angle is illustrated in FIG. 6D. A photosensitive layer 617 that is holographically exposed and developed is mounted at a small angle such as five degrees within a transparent medium 619. Collimated light in primary colors such as red, green, and blue is directed onto one or more edges of the holographic structure, producing the input light for the DMD micromirror array 418 at a desired illumination angle such as an angle of about 26 degrees.

Figure 7A:
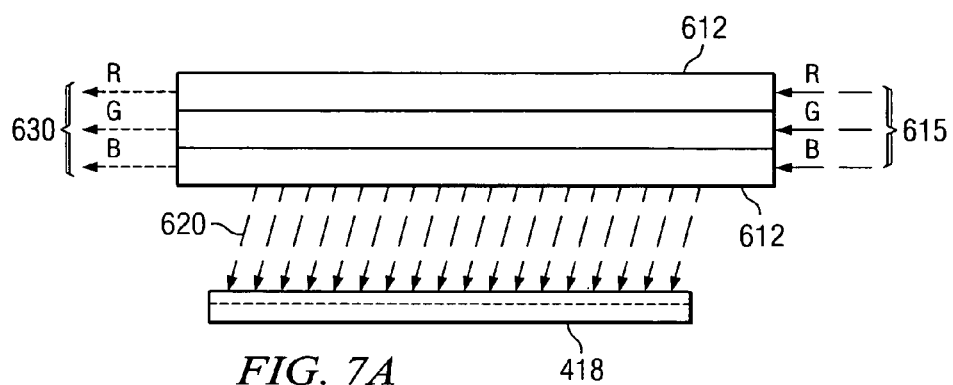
FIG. 7A illustrates DMD illumination using a volume hologram red-green-blue stack of the invention.

As illustrated in FIG. 7A, the illumination hologram 612 in an embodiment of the invention may be formed as a single volumetric hologram structure or holographic RGB (red-green-blue) film stack, assembled above and parallel to the DMD active mirror area. This holographic optical element used for the illumination hologram is preferably able to work with primary colors such as red, green, and blue and may be composed of films, crystal, glass, photorefractive polymer, or other optical material. In prior-art designs, a protective glass window is generally assembled above the DMD. In this embodiment of the invention the holographic structure can replace the window or be mounted on the window with an index-matching adhesive such as Epo-Tek 301 from Conservation Resources International to substantially eliminate surface reflections. The illumination hologram is fabricated to have a programmed internal pattern that directs a reconstructed light beam in a desired direction such as 26 degrees from a normal to the DMD surface when the hologram is illuminated with a reference beam, and constructed using techniques well known in the art.

In a further embodiment of the invention, the illumination hologram is constructed as a stack of diffractive optical elements, each diffractive optical element corresponding to a single wavelength of illumination, for example red, green, or blue. Separately programmed holograms are less complicated to design and are potentially more efficient in transmission of single wavelengths.

Figure 7B:
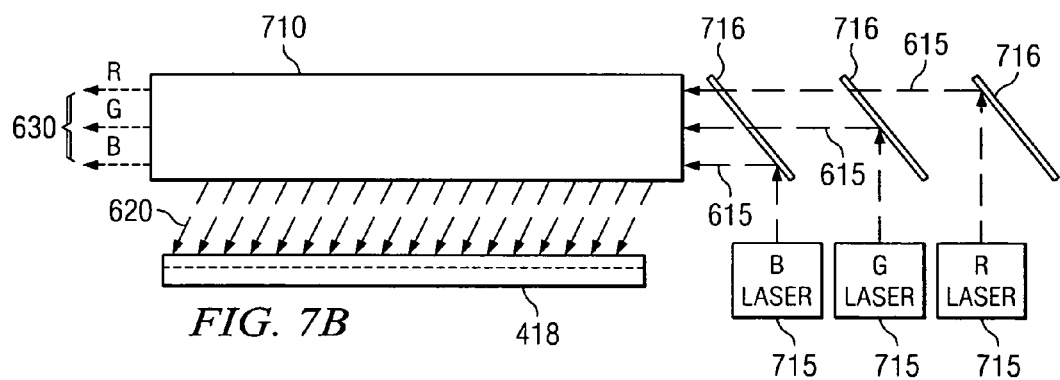
FIGS. 7B, 7C, and 7D illustrate light input methods of the invention for DMD illumination.
Figure 7C:
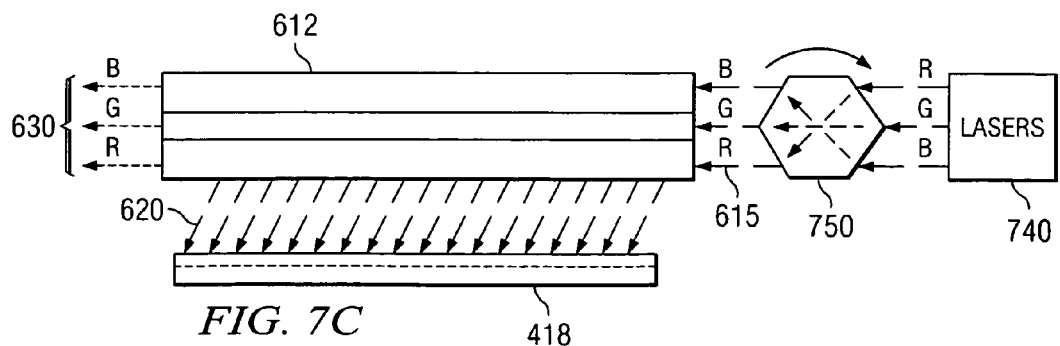
Figure 7D:
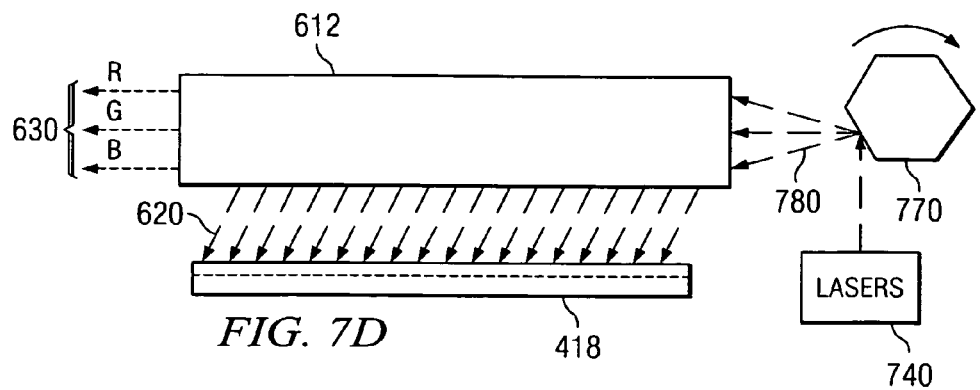

FIGS. 7B, 7C, and 7D illustrate several methods of using lasers to illuminate an illumination hologram. FIG. 7B illustrates lasers 715 each tuned to emit primary color beams that are reflected and filtered with optical elements 716 with dichroic coatings. The dichroic coatings provide a wavelength-specific reflecting surface that reflects light of a certain wavelength and passes light with other wavelengths. Thus, the dichroic coating on the leftmost optical element 716 reflects the light beam from the leftmost laser 715 while passing light beams from the other two lasers. Similarly, the dichroic coating on the middle optical element 716 reflects the light beam from the middle laser 715 while passing the light beam from the rightmost laser. In this manner the lasers 715 and the dichroic filters 716 can be stacked to produce a compact illumination arrangement for an illumination hologram. LEDs can alternatively be used to emit color beams.

Several alternatives can be used to generate beams that span and uniformly illuminate an edge of an illumination hologram. These alternatives include without limitation: 1) using lasers with fanned beams; 2) using prisms to fan the beams; 3) using an array of lasers to produce a widened beam; and 4) using a rotating reflecting or refracting optical element to cause a beam to span an edge. One or more edges of an illumination hologram such as volume hologram 710 is thus illuminated, and a DMD or other spatial light modulator is sequentially scanned with filtered light beams.

FIG. 7C illustrates lasers 740 (or LEDs) that illuminate a rotating, polygon-shaped, optical element 750 to refractively produce color beams 615 to illuminate one or more edges of an illumination hologram such as a volume hologram RGB stack 612 and sequentially illuminate a DMD or other spatial light modulator. The rotating structure comprises an optically refractive material such as glass. The rotating optical element 750 scans light beams across the width of a possibly extended edge of the volume hologram stack 612 or across the length of the edge. A plurality of rotating optical elements can be employed to scan a plurality of edges of the volume hologram stack. The rotation rate and phase of the rotating, optically refracting element are synchronized with the scanning process for the image generated by the spatial light modulator.

FIG. 7D illustrates lasers 740 that illuminate a rotating, reflective, polygon-shaped, optical element 770 or a galvanometer scan mirror to produce light beam 780 to illuminate one or more extended edges of an illumination hologram 612 that may comprise a monolithic or stacked holographic film. Thereby, a DMD or other spatial light modulator is sequentially illuminated with reflected light beams. The reflecting surfaces of the rotating, reflective optical element can be chosen to be substantially wavelength independent, and the scanning process can be arranged with multiple optical elements to scan a plurality of sides of the illumination hologram. The rotation of the rotating optical element also scans light beams across the width of a possibly extended edge of the volume hologram stack 612 or across the length of the edge. The rotation rate and phase of the rotating, optically reflective element, also, are synchronized with the scanning process for the image generated by the spatial light modulator.

Figure 8:
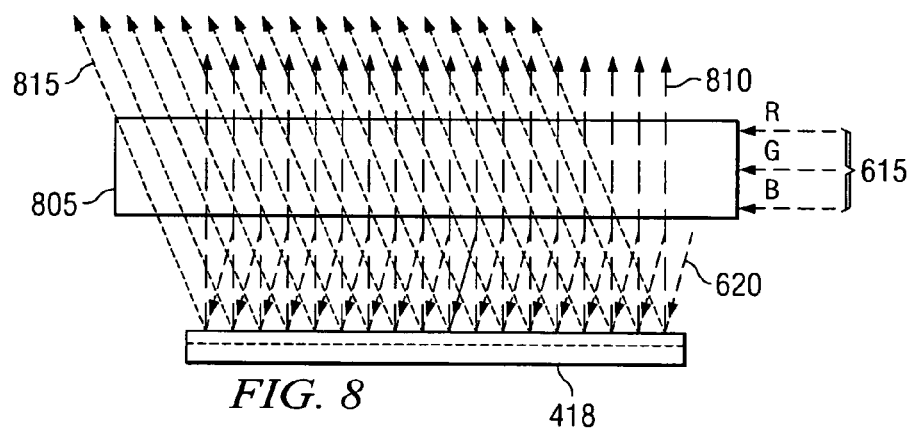
FIG. 8 illustrates on-state and off-state rays from a holographic optical element of the invention.

As illustrated in FIG. 8, in a further embodiment of the invention, a single illumination hologram such as volumetric holographic optical element 805 is constructed with multiple internal patterns corresponding to the distinct wavelengths of the illuminating light. In this embodiment, the illumination hologram may be physically smaller, accepting light from different sources with different wavelengths and locations, while causing beams 615 of each color such as red, green, and blue to converge at the DMD active mirror array. Illumination light rays that are not diffracted by the illumination hologram to the DMD, due to DE loss, are passed through the illumination holographic structure with minimal effect on image contrast. The projection beam 810 is transmitted from the DMD through and normal to the hologram. Off-state and flat-state rays 815 pass through the holographic structure and are absorbed harmlessly elsewhere in the projection system where they do not affect the projected image.

Figure 9A:
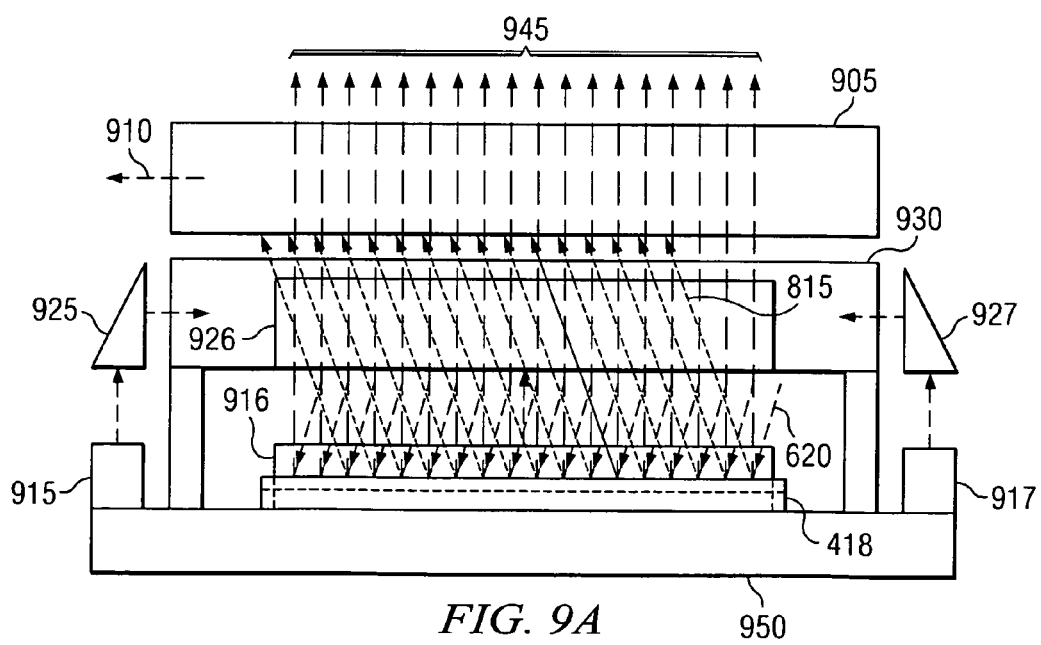
FIGS. 9A and 9B illustrate the use of illumination and projection holographic optical elements of the invention to illuminate a DMD.

As illustrated in FIG. 9A, a second hologram, projection hologram 905, is placed either above or below the illumination hologram 930 to filter the desired projection light from any wasted or scattered light. Light sources 915, 916, and 917 produce collimated light beams preferably in primary colors which are redirected by prisms 925, 926, and 927 into one or more edges of the illumination hologram 930. The prisms 925, 926, and 927 preferably have reflective coatings on their surfaces. As indicated for prism 926, the length of the prisms 925, 926, and 927 extends substantially over the width of the DMD so that the entire surface of the DMD can be illuminated by the illumination hologram 930. In an alternative embodiment, mirrors are used to redirect the light beams into the illumination hologram 930. The projection hologram is programmed to allow the passage of the projection beam 945 from the DMD to the projector output. Light rays 815 reflected from the DMD at angles other than the desired projection beam angle are diffracted and steered away from the projection path optics. Waste light 910 and scattered rays 815 are directed by the projection hologram 905 toward an edge where they exit to be absorbed and dissipated by a heat sink (not shown). Of course, the projection hologram, receiving the image beam from the diffractive optical element and waste light produced by the spatial light modulator, may direct the waste light away from the pupil of the projection optics, and may not require an edge exit. Functioning also as a projection beam pass filter, the projection hologram significantly improves image dark levels and contrast. The projection hologram 905 can be constructed as a separate optical element and assembled to the illumination hologram 930. In an alternative embodiment of the invention, a more complex hologram can be designed and programmed to combine into one optical element both the illumination and the projection light-processing functions.

The collimated light sources 915, 916, and 917 illustrated in FIG. 9A may be: 1) LEDs with collimating optics, or 2) laser diodes, such as VCSELs (vertical cavity surface emitting lasers) or edge-emitting lasers. Another laser candidate is the NECSEL™ (Novalux extended cavity surface-emitting laser) made by Novalux, Inc. The NECSEL device includes PPLN (periodically-polled lithium-niobate) to up-convert the frequency by frequency doubling of an infrared-emitting diode array to visible red, green, and blue light. The emission profile of the light sources should have an aspect ratio and direction that maximizes the light directed into the hologram. Edge-emitting laser diodes are particularly useful in this invention, since they have an elongated emission profile, which will better match the aspect ratio of the input edge of the hologram. For embodiments of the invention using laser diode arrays to create the input light beam, the input surface of the holographic structure may also include a diffractive or refractive structure or an additional optical element to act on the input beams from the individual diodes. The input beam can be shaped in this way, expanded in size or diffused according to the input prescription of the holographic structure. To provide uniform illumination of the DMD, either the hologram or a separate input optical device may perform the light-homogenizing function.

It is also practical and anticipated that the light sources, an ASIC (application-specific integrated circuit) controller, LED drive circuitry, and light feedback sensors to control light source intensities, would be assembled on the same circuit plane as the DMD or mounted on a common printed-wiring board 950. If desired, fold mirrors or diffractive optics can be used to direct the source light into the holographic structure in place of prisms 925, 926, and 927. As holograms are most efficient along certain light paths, it may be desirable to direct the light from the most-needed source wavelength along the most efficient path. It is also possible to direct light from different directions to the DMD as described in U.S. patent application Ser. No. 10/926,817, filed Aug. 26, 2004, which is hereby referenced and included herein. Light sources and wavelengths such as amber and cyan in addition to those of primary colors such as red, green, and blue can be used and can advantageously provide improvements in image quality. The additional colors can be combined into the illumination hologram using optical filters and operated on demand as described in U.S. patent application Ser. No. 10/926,483, filed Aug. 26, 2004, which is hereby referenced and included herein.

Figure 1:
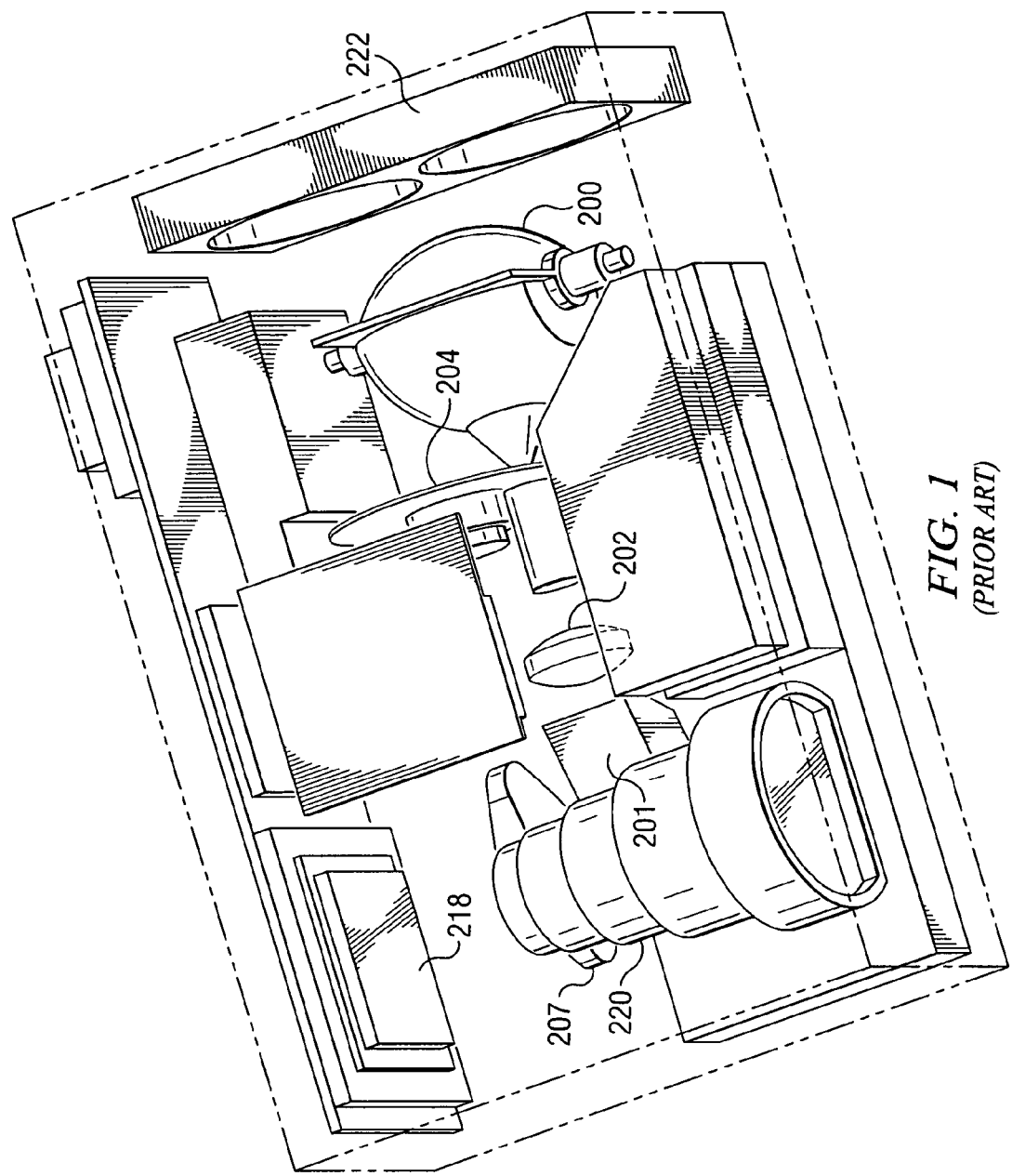
FIG. 1 illustrates a typical single-DMD projector of the prior art.
Figure 2:
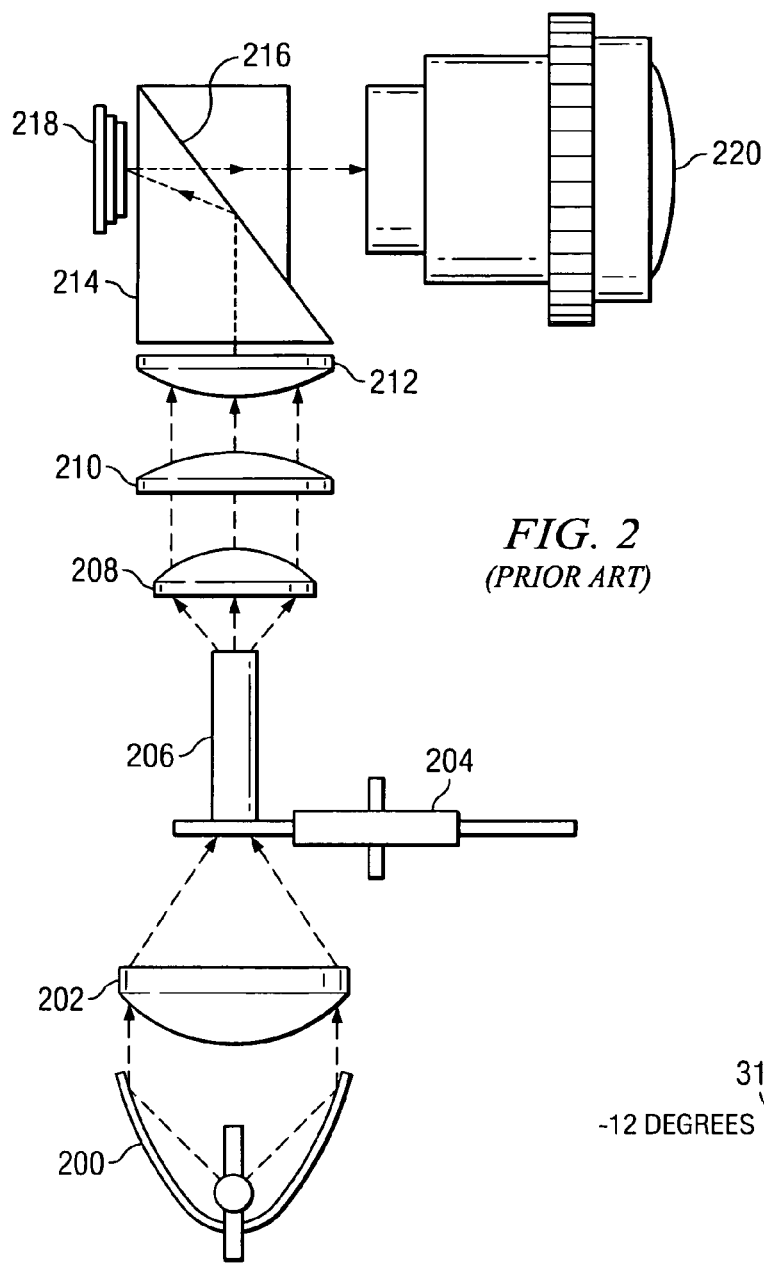
FIG. 2 illustrates a single-DMD illumination architecture of the prior art.
Figure 3:
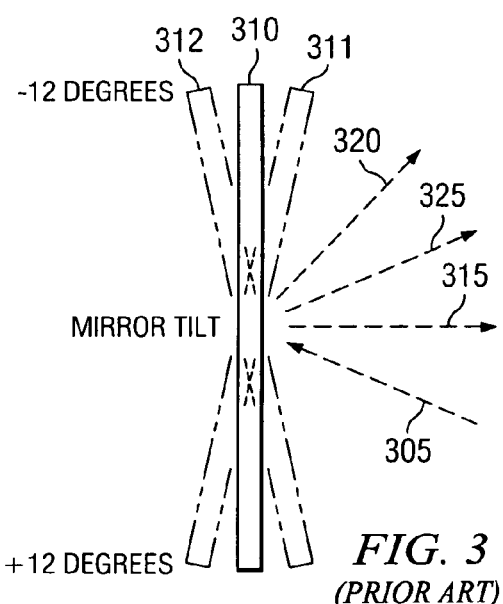
FIG. 3 illustrates a micromirror that selectively controls the path of a light beam.
Figure 4:
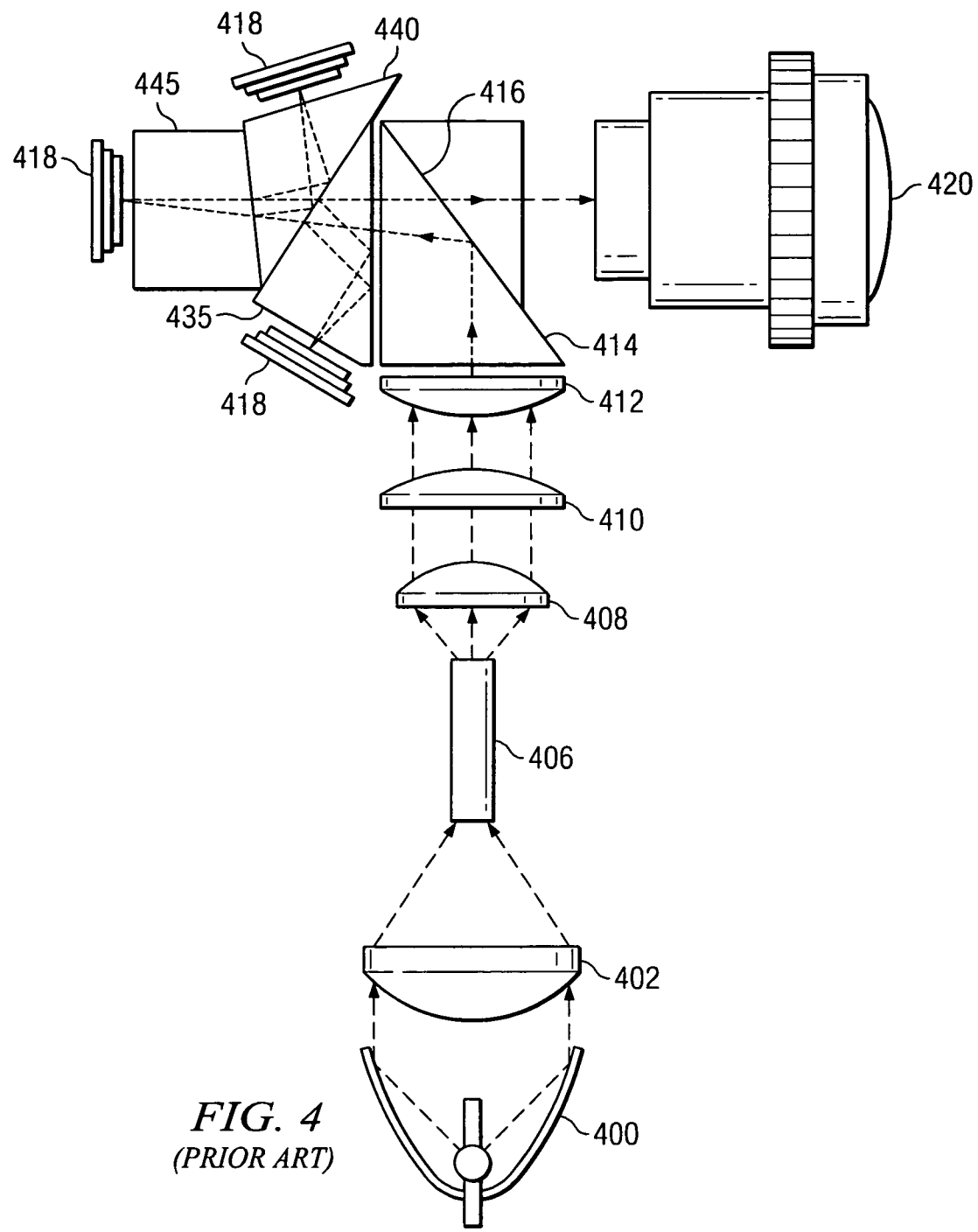
FIG. 4 illustrates a three-DMD illumination architecture of the prior art.

As illustrated in FIG. 9A and with reference again to FIG. 3, when illuminated, the DMD micromirrors are tilted +12 degrees (on-state) toward the incoming light, thereby reflecting the projection light into a path normal to and through the holograms. When the DMD mirrors are tilted −12 degrees (off-state), the resulting light reflection are redirected by the projection hologram and transmitted through the waste-light output edge(s). In this manner, the majority of off-state light may be removed from the hologram, such that thermal stress on the optics is minimized. This is especially important in the case where plastic materials are used to construct the optical elements.

Figure 9B:
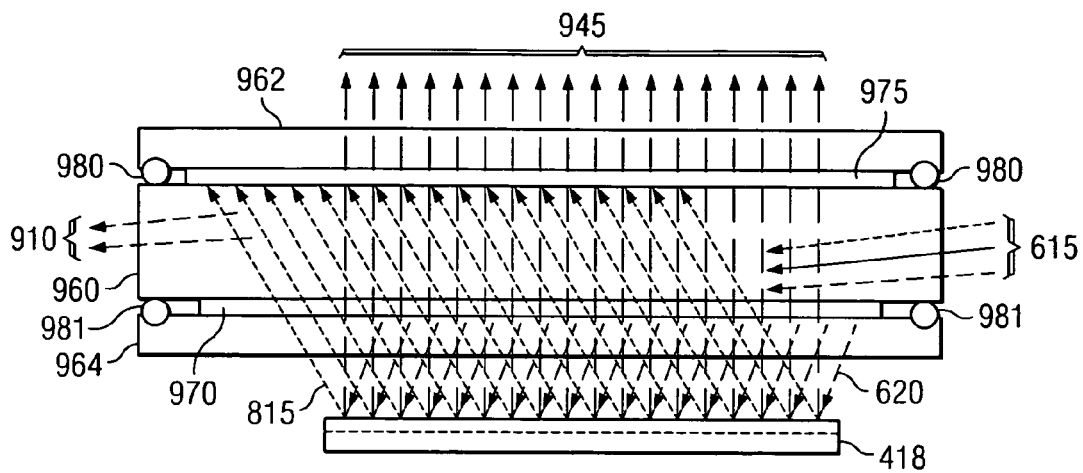

Turning now to FIG. 9B, holographic optical element 970 for illumination of a spatial light modulator such as a DMD micromirror array 418 is positioned on the lower surface of an optically transparent medium 960. Preferably, the optically transparent medium is a glass medium three to five mm thick, and preferably, the holographic optical element 970 is a holographic film. The holographic optical element is typically produced using DCG (dichromated gelatin), a silver halide, or another light-sensitive photosensitive material that can be used to produce a volumetric optical hologram. The film 970 is adhered to the optically transparent medium 960, exposed, preferably with a laser light source, and developed to produce a holographic pattern on the film. The film may be formed by contact printing or by using a material such as DCG that can be spun onto the optically transparent medium 960.

The holographic optical element 970 is protected, preferably by a cover glass 964 adjacent to its outer surface with a moisture barrier or hermetic seal. The cover glass 964 is typically one mm thick. The moisture barrier or hermetic seal may be formed with O-rings such as O-ring 981 or other sealing material such as a curable sealant. An index-matching fluid is preferably deposited between the cover glass and the holographic optical element to reduce or substantially eliminate reflections at surfaces along the optical path, and to provide further protection for the holographic optical element.

The lower surface of the optical arrangement illustrated in FIG. 9B can be advantageously used as a protective cover for DMD micromirror array 418, including a hermetic seal (not shown) for the DMD micromirror array.

Collimated light beams 615, preferably in primary colors, are directed onto one or more edges of the optically transparent medium 960. Recognizing that the optical performance of the holographic optical element may be dependent on the angle of incidence of the illuminating light and on the wavelength of the light, the light beams may be directed at different angles for different wavelengths. For example, red light may be directed at the optically transparent medium to produce a light propagation angle of 5° to 7° within the optically transparent medium. Green light may be directed to produce a light propagation angle of 8° to 10°, and blue light, an angle of 11° to 13°. A holographic optical element will generally be sensitive to the polarization of the incident light. Preferably, the polarization of the incident light is aligned with a preferred polarization direction for a holographic optical element. Alternatively, the incident light is not polarized. The use of different light propagation angles for illumination of a holographic optical element and alignment of the polarity of incident light with a preferred polarization of the holographic optical element may be advantageously applied to any of the embodiments described herein.

Waste light 910 such as due to off-state light, flat-state light, or scatter is directed out of an edge of the optically transparent medium 960 by the holographic optical element 975 positioned on an upper surface of the optically transparent medium (i.e., a surface opposing the surface on which the holographic optical element 970 is positioned). The holographic optical element 975 is also protected, preferably by a cover glass 962 adjacent to its outer surface with a hermetic seal. The cover glass 962 is typically one mm thick. The hermetic seal may be formed with O-ring 980 or other sealing material such as a curable sealant. An index-matching fluid may be deposited between the cover glass and the holographic optical element 975 to reduce or substantially eliminate reflections at surfaces along the optical path, and to provide further protection for the holographic optical element.

Figure 9C:
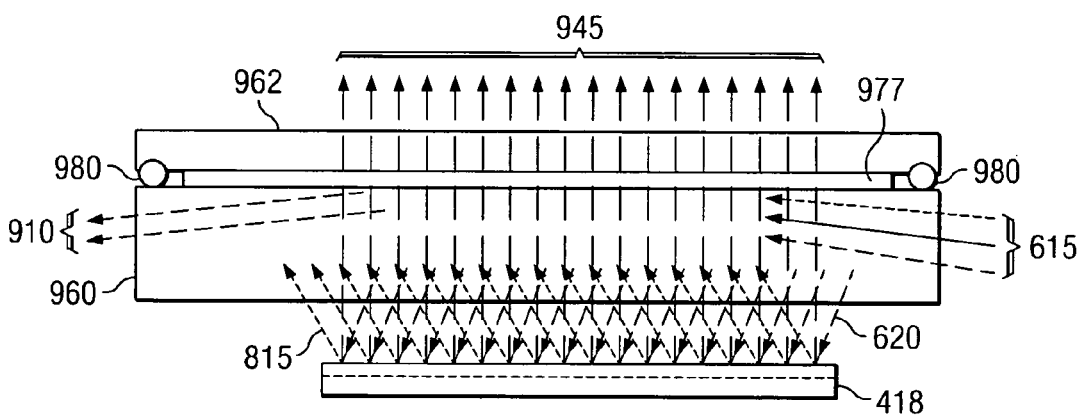
FIGS. 9C and 9D illustrate the use of a combined illumination and projection holographic optical element of the invention to illuminate a DMD.

FIG. 9C illustrates an optical arrangement of a further embodiment of the invention wherein a holographic film for illumination of a spatial light modulator such as a DMD micromirror array is positioned on an upper surface of an optically transparent medium 960 such as a glass medium. In the illustrated embodiment, the functions of illumination of a spatial light modulator and redirection of waste light 910 to an edge of an optical element are combined in a single holographic optical element. In the illustrated embodiment, both functions are performed using reflected light from the holographic optical element. However, in a further embodiment, waste light can be redirected using refractive properties of a holographic optical element, wherein the waste light 910 is redirected to an edge of the cover glass 962.

Figure 9D:
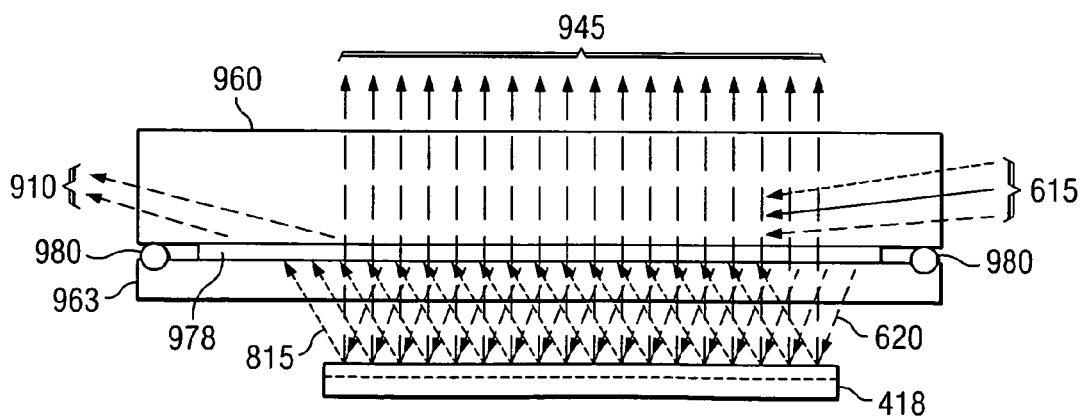

FIG. 9D illustrates an optical arrangement of a further embodiment of the invention wherein a holographic film is positioned on a lower surface of an optically transparent medium such as a glass medium. In this illustrated embodiment, the functions of illumination of a spatial light modulator and redirection of waste light to an edge of an optical element are again combined in a single holographic optical element. In the illustrated embodiment, both functions are performed using refracted light from the holographic optical element. However, in a further embodiment, waste light 910 can be redirected to an edge of cover glass 963 using reflective properties of a holographic optical element.

Figure 10:
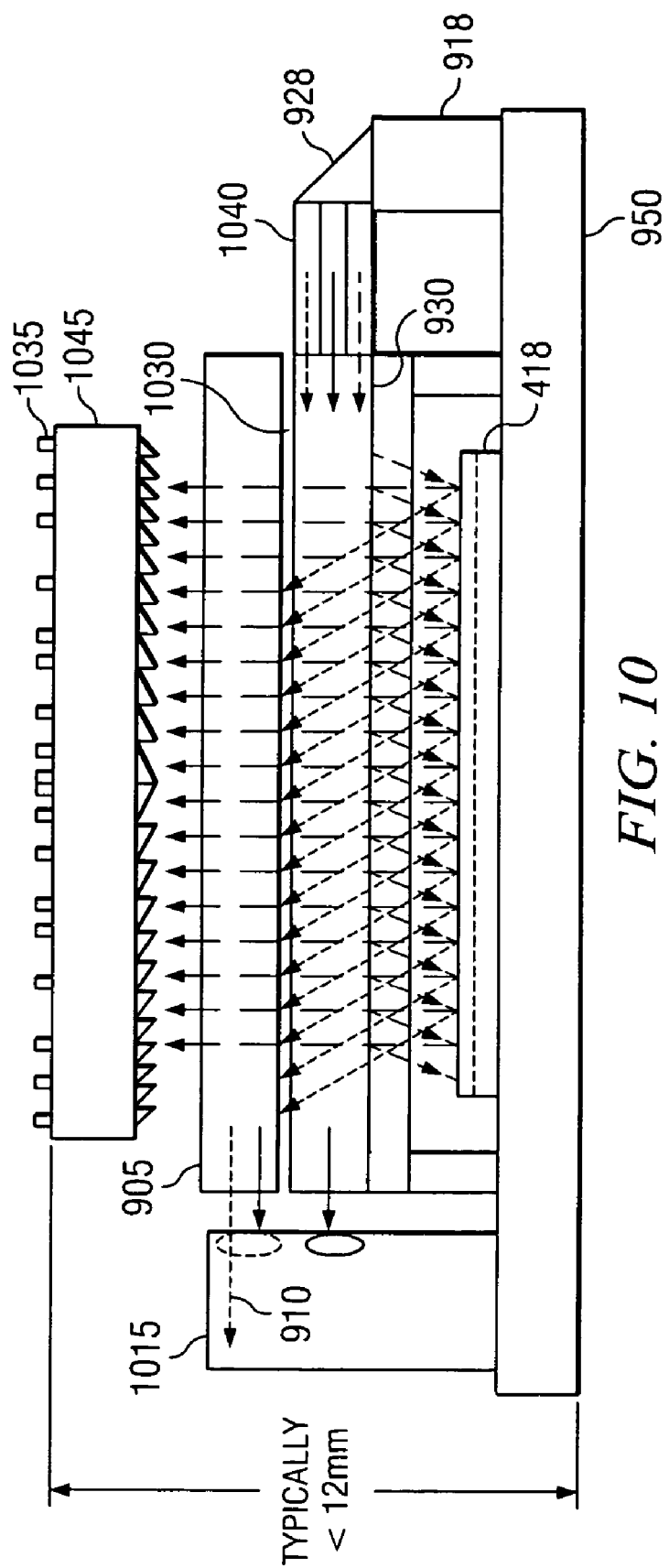
FIG. 10 illustrates illumination and projection holographic optical elements of the invention including a kinoform optical element to focus the image.

Turning now to FIG. 10, a refractive/diffractive kinoform optical device 1045 is illustrated in a further embodiment of the invention to produce a more compact projection system for final magnification and projection of the DMD image such as onto a viewing surface. The kinoform optical device may be formed with an upper surface with binary diffractive optics and a lower surface formed as a fresnel lens. Lasers such as laser 918 illuminate the illumination hologram 930 through prisms such as prism 928 and optical frequency doublers 1040. In a preferred embodiment, the lasers are IR (infra-red) lasers and the frequency doublers are formed using periodically-poled lithium niobate to up-convert the frequency of the IR light beams into the visible spectrum. Since short-wavelength light is not generated in this arrangement, polymers may be used to form the holographic structures without concern for short-wavelength degradation. A projection hologram 905 is bonded to the illumination hologram 930 using an index-matching optical material 1030 to eliminate reflections at the hologram surfaces. Off-state and flat-state light rays 910 are transmitted through one or more edges of the projection hologram to light absorber/heat sinks 1015 where they are dissipated. In addition, in a further embodiment of the invention, the off-state and flat-state light rays are also absorbed in a color-feedback photometer to control the intensity of the lasers or other light-generating sources to improve image quality. Projection light rays are transmitted through the holograms to a lens for final image projection to a target screen for viewing. Using a kinoform optical device in conjunction with the bonded holographic structures allows construction of a projection system in a height less than 12 mm (0.5 inch). In an alternative embodiment, a conventional lens group can be used to project the image of the DMD onto the target screen.

Figure 11:
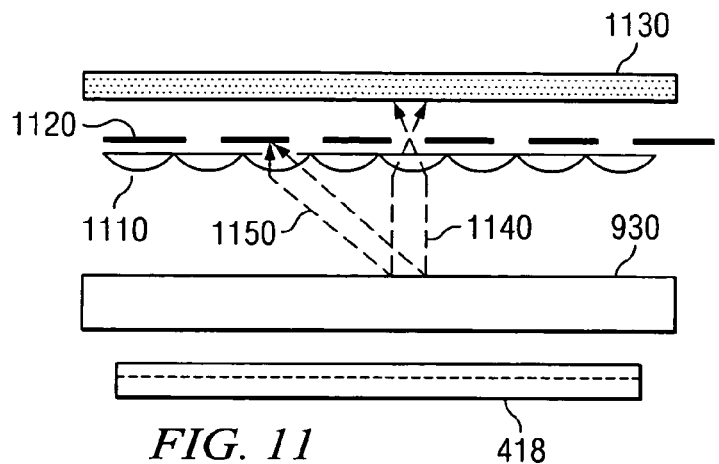
FIG. 11 illustrates a projection architecture of the invention including an off-state lens filter.

As illustrated in FIG. 11 in a further embodiment of the invention, in place of the projection hologram described with reference to FIG. 10, a lens array 1110 and a plurality of black stripes 1120 are arranged to block off-state light 1150 transmitted through the illumination hologram 930, and to pass light 1140 forming the image to be projected. A diffuser 1130 smoothes the image prior to transmission through a projection lens (not shown) for projection onto a screen. This arrangement can advantageously be used to produce compact and portable display terminals such as used in cellular telephones and in personal and laptop computers.

Figure 12:
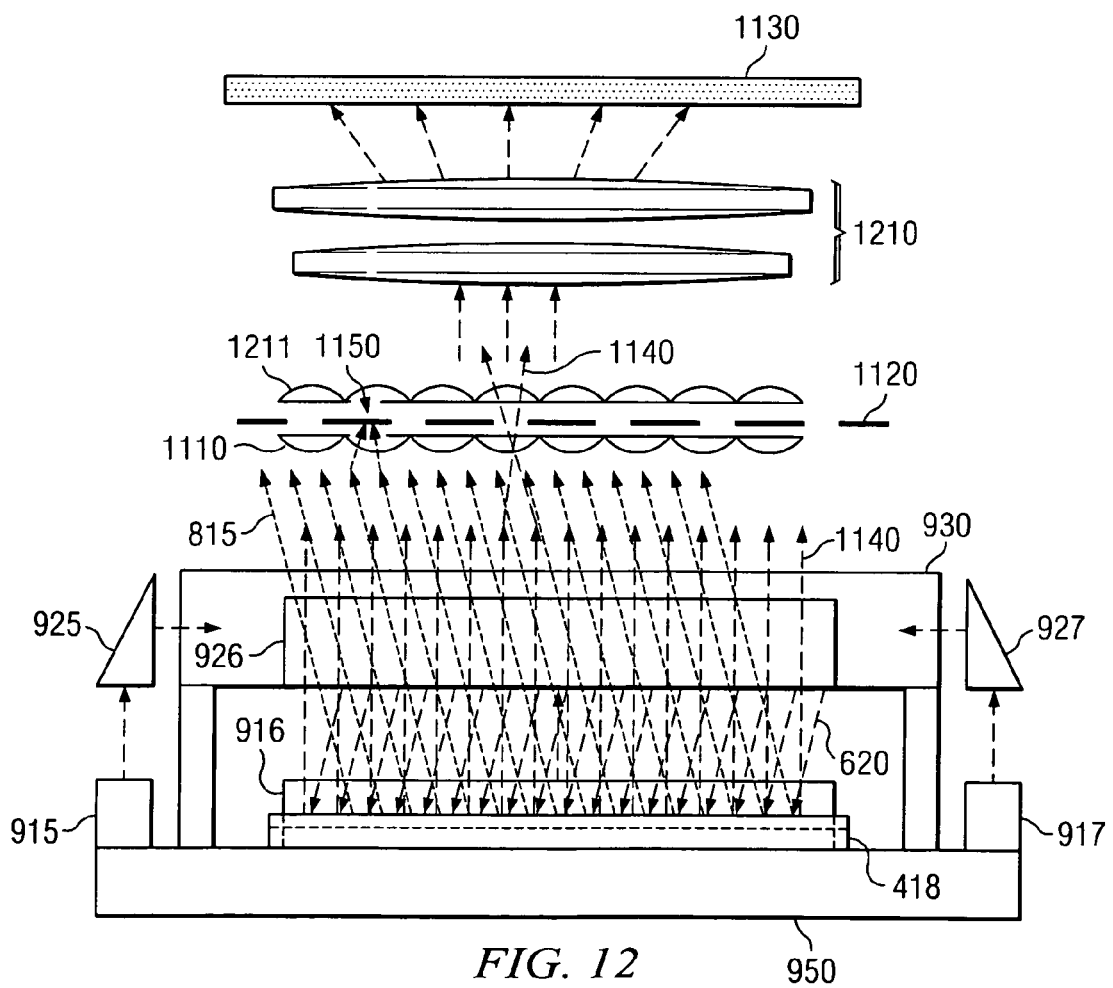
FIG. 12 illustrates a projection architecture of the invention including an off-state lens filter and magnification optics.

As illustrated in FIG. 12 in a further embodiment of the invention, magnification optics 1210 are used to create an enlarged image on diffuser 1130. Lens arrays 1110 and 1211 and a plurality of black stripes 1120 are arranged to block off-state light 1150 transmitted through the illumination hologram 930, and to pass light 1140 forming the image to be projected.

For a better understanding of holographic devices and methods see "Edgelit Holography: Extending Size and Color," by R. S. Nesbitt, M. S. Thesis, Massachusetts Institute of Technology, September, 1999; and "Imaging Using Volume Holograms," by A. Sinha, et al., published in Optical Engineering, September, 2004, pp. 1959-1972. The aforementioned references are incorporated herein by reference in their entirety.

Although embodiments of the present invention and its advantages have been described in detail, it should be understood that various changes, substitutions and alterations can be made herein without departing from the spirit and scope of the invention as defined by the appended claims. For example, it will be readily understood by those skilled in the art that the optical and electrical elements and utilization of techniques to form the processes and systems providing a projected image as described herein may be varied while remaining within the broad scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An image projection system comprising:
    a light source to produce a plurality of collimated, colored, light beams;
    a diffractive optical element optically coupled to the light source and illuminated by the collimated colored light beams;
    a spatial light modulator illuminated by a diffracted beam of light from the diffractive optical element to form an image beam; and
    a projection hologram with at least one edge, the projection hologram receiving the image beam and waste light produced by the spatial light modulator and emitting waste light from an edge of the projection hologram.

2. The image projection system according to claim 1, wherein waste light emitted from an edge of the projection hologram is absorbed by a light sensor to produce an intensity signal coupled to a controller, the controller coupled to the light source to control the intensity of the collimated, colored, light beams produced by the light source using the intensity signal.

3. The image projection system according to claim 1, wherein a portion of the light produced by light sources is not diffracted to the spatial light modulator, and wherein the diffractive optical element emits the non-diffracted light from an edge of the diffractive optical element.

4. The image projection system according to claim 1, wherein the projection hologram is bonded to the diffractive optical element with index-matching optical material.

5. The image projection system of claim 1, further comprising:
    a projection focusing element that receives the image beam from the spatial light modulator and focuses the image beam for viewing.

6. The image projection system of claim 1, wherein the diffractive optical element is a volume hologram.

7. The image projection system of claim 1, wherein at least two of the collimated colored light beams illuminate different faces of the diffractive optical element.

8. The image projection system of claim 1, wherein the diffractive optical element includes a photorefractive layer lying at an angle to a surface of the diffractive optical element.

9. The image projection system of claim 1, further comprising:
    a kinoform optical element receiving the image beam and focuses the image beam for viewing.

10. An image projection system comprising:
    a light source to produce a plurality of collimated, colored, light beams;
    a diffractive optical element optically coupled to the light source and illuminated by the collimated colored light beams;
    a spatial light modulator illuminated by a diffracted beam of light from the diffractive optical element to form an image beam; and
    a projection hologram receiving the image beam and waste light produced by the spatial light modulator and directing the waste light away from the pupil of the projection optics.

11. The image projection system according to claim 10, the projection hologram having at least one edge, and wherein the waste light does not all exit the edge.

12. The image projection system of claim 11, the projection hologram having at least one edge, and wherein the waste light exits the edge.

13. The image projection system according to claim 10, wherein waste light emitted from the projection hologram is absorbed by a light sensor to produce an intensity signal coupled to a controller, the controller coupled to the light source to control the intensity of the collimated, colored, light beams produced by the light source using the intensity signal.

14. The image projection system according to claim 10, wherein a portion of the light produced by light sources is not diffracted to the spatial light modulator, and wherein the diffractive optical element emits the non-diffracted light from an edge of the diffractive optical element.

15. The image projection system according to claim 10, wherein the projection hologram is bonded to the diffractive optical element with index-matching optical material.

16. The image projection system of claim 10, wherein the diffractive optical element is a volume hologram.

17. The image projection system of claim 10, wherein at least two of the collimated colored light beams illuminate different faces of the diffractive optical element.

18. The image projection system of claim 10, wherein the diffractive optical element includes a photorefractive layer lying at an angle to a surface of the diffractive optical element.

19. The image projection system of claim 10, further comprising:
    a kinoform optical element receiving the image beam and focuses the image beam for viewing.

20. An image projection system comprising:
    a light source to produce a plurality of collimated, colored, light beams;

a diffractive optical element optically coupled to the light source and illuminated by the collimated colored light beams;

a spatial light modulator illuminated by a diffracted beam of light from the diffractive optical element to form an image beam; and a kinoform optical element that receives the image beam from the spatial light modulator and focuses the image beam for viewing.

21. The image projection system according to claim 20, wherein the kinoform optical element comprises a first side with a binary diffractive surface.

22. The image projection system according to claim 21, wherein the kinoform optical element comprises a second side with a refractive image-focusing surface.

23. The image projection system according to claim 20, further comprising:

a projection hologram receiving the image beam and waste light produced by the spatial light modulator and emitting waste light;

a light sensor receiving the waste light and producing an intensity signal, the light sensor coupled to a controller, the controller coupled to the light source to control the intensity of the collimated, colored, light beams produced by the light source using the intensity signal.

24. The image projection system according to claim 23, wherein the projection hologram is bonded to the diffractive optical element with index-matching optical material.

25. The image projection system according to claim 20, wherein a portion of the light produced by light sources is not diffracted to the spatial light modulator, and wherein the diffractive optical element emits the non-diffracted light from an edge of the diffractive optical element.

26. The image projection system of claim 20, wherein the diffractive optical element is a volume hologram.

27. The image projection system of claim 20, wherein at least two of the collimated colored light beams illuminate different faces of the diffractive optical element.

28. An image projection system comprising:

a light source to produce a plurality of collimated, colored, light beams;

a diffractive optical element optically coupled to the light source and illuminated by the collimated colored light beams; and a spatial light modulator illuminated by a diffracted beam of light from the diffractive optical element to form an image beam, wherein waste light is produced by the spatial light modulator, and wherein the diffractive optical element emits waste light from an edge of the diffractive optical element.

29. The image projection system of claim 20, wherein the diffractive optical element includes a photorefractive layer lying at an angle to a surface of the diffractive optical element.

30. The image projection system of claim 28, wherein the diffractive optical element is a volume hologram.

31. The image projection system of claim 28, wherein at least two of the collimated colored light beams illuminate different faces of the diffractive optical element.

32. The image projection system of claim 28, wherein the diffractive optical element includes a photorefractive layer lying at an angle to a surface of the diffractive optical element.

33. The image projection system of claim 28, farther comprising:

a kinoform optical element receiving the image beam and focuses the image beam for viewing.

* * * * *

UNITED STATES PATENT AND TRADEMARK OFFICE
CERTIFICATE OF CORRECTION

PATENT NO. : 7,651,227 B2  
APPLICATION NO. : 11/225327  
DATED : January 26, 2010  
INVENTOR(S) : Penn et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1021 days.

Signed and Sealed this

Twenty-eighth Day of December, 2010

David J. Kappos  
*Director of the United States Patent and Trademark Office*